March 13, 1934.  A. G. ANDREWS  1,950,378
STRAINER
Filed May 7, 1932
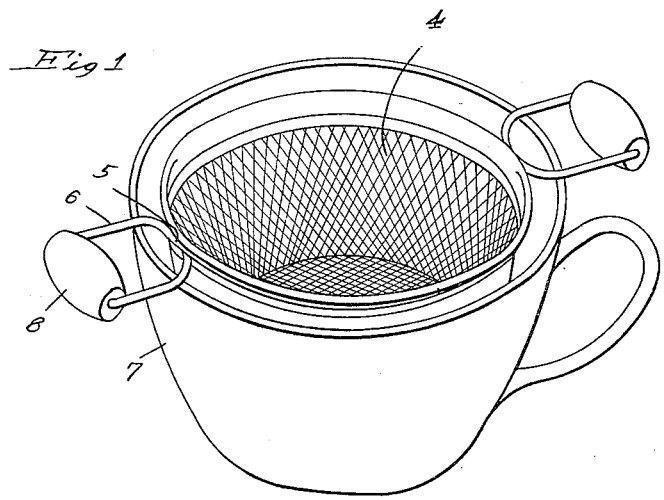
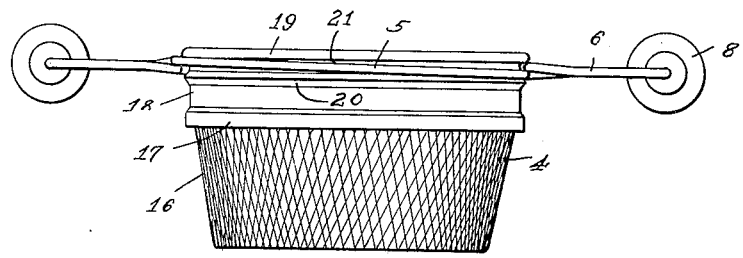
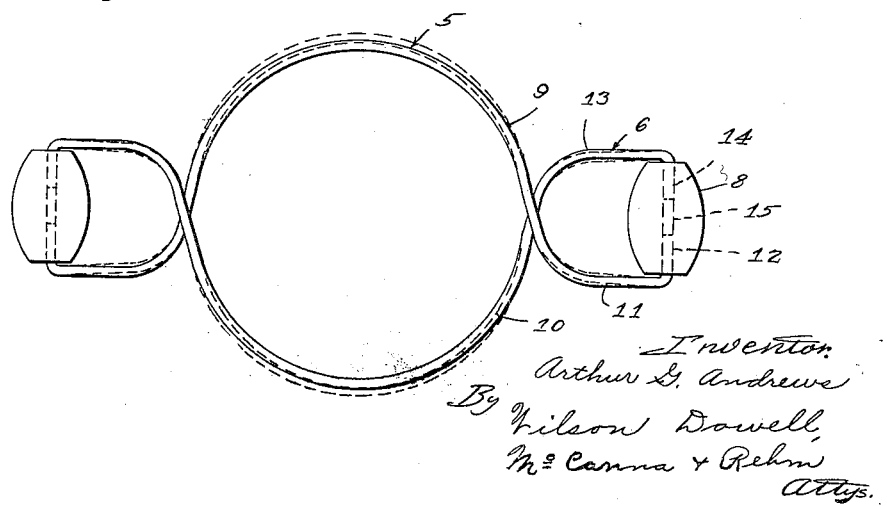
Inventor.
Arthur G. Andrews
By Wilson Dowell,
McCanna & Rehm
Attys.

Patented Mar. 13, 1934

1,950,378

UNITED STATES PATENT OFFICE 1,950,378

STRAINER

Arthur G. Andrews, Rockford, Ill., assignor to The Washburn Company, Worcester, Mass., a corporation of Massachusetts Application May 7, 1932, Serial No. 609,872

4 Claims. (Cl. 210—181)

This invention relates to strainers.

The principal object of my invention is to provide a strainer so constructed that when it is placed on a cup, glass or other receptacle, it does not have to be held to prevent tipping, the same being of a symmetrical, balanced construction.

Another object consists in providing a supporting frame for a strainer of this kind made up of a pair of wires assembled together on a pair of opposed knobs in such a way that the insertion of the strainer bowl holds the parts in assembled relation, thereby reducing the construction to the simplest and most economical form.

The invention is illustrated in the accompanying drawing, in which—

Figure 1 is a perspective view showing the strainer of my invention placed on a cup ready for use;

Fig. 2 is a side view of the strainer, and

Fig. 3 is a plan view of the frame.

The same reference numerals are applied to corresponding parts in these views.

As shown in Figure 1, the strainer of my invention comprises a screen bowl 4 and a supporting ring-shaped wire frame 5 having diametrically opposed lateral extensions 6 for supporting the strainer on the rim of a cup 7, or on a glass or other receptacle of proper size. Knobs 8 are provided on the lateral extensions 6 to serve as handles. The construction, being symmetrical, gives an even distribution of weight on both sides of the strainer as it rests on the rim of the cup, so that it does not have to be held in order to keep it from tipping, as was the case with other strainers heretofore available, where the weight of the elongated handle on one side of the strainer made it unbalanced and easy to tip. The bottom of the screen bowl is made flat, as appears in Fig. 2, and this, coupled up with the balanced symmetrical construction of the frame 5, makes it possible for the strainer to stand by itself when removed from the receptacle. The length of the lateral extensions 6 adapts the strainer to different sized receptacles, and the broad support afforded by each of these extensions avoids likelihood of the strainer tipping about the extensions as an axis.

The frame 5, as appears in Fig. 3, is formed from two pieces of wire 9 and 10, both substantially bail-shaped so as to define a circle at the middle of the frame when the two pieces are placed in opposed relation, as shown in Fig. 3. The free ends of the wire 9 are bent outwardly into alignment with one another on a line substantially parallel with a diameter of the aforesaid circle, as indicated at 11, and the extremity of the end portions 11 are bent back at right angles, as at 12. In like manner, the wire 10 has end portions 13 with the extremities 14 thereof bent back at right angles for alignment with the extremities 12 of the other wire. The knobs 8, which are preferably of wood, have holes 15 therein into which the extremities 12 and 14 are entered from opposite ends. Naturally, it takes very little time to make up the assembly described, and the parts 9 and 10 as well as the two parts 8 are counterparts, so that only one kind of wires and one kind of knobs have to be stocked, which makes for economy, as well as simplifying assembling. The screen bowl 4 has the edges of the screen 16 thereof clinched in the lower portion 17 of the sheet metal ring or rim 18. The latter has an outwardly projecting rim 19 formed on the upper edge thereof and an annular bead 20 below the same and spaced therefrom sufficiently to receive the wire frame 5 therebetween in the groove 21, as appears in Fig. 2. When the wires 9 and 10 are assembled on the knobs 8, as in Fig. 3, the middle of the frame 5 is sufficiently undersize so that the wires have to be spread apart, as indicated by the dotted lines, when the screen bowl 4 is inserted, especially when the bead 20 is forced past the wires. The springiness of the wires between the extremities entered in the knobs 8 permits the wires to be spread apart in the manner stated and to spring back when the wires enter the annular groove 21, so that the bowl 4 is gripped tightly. The springing of the wires also tends toward a much tighter hold of their extremities on the knobs 8 so that the latter usually are not free to turn. If the wires 9 and 10 are placed with one end over and the other end under the other wire, as shown in Fig. 3, it has the effect of so distorting the wires when the screen bowl is entered that the bowl and the knobs are gripped still tighter. However, this is not essential and there is no need of adding that complication to the assembling operations.

It is believed the foregoing description conveys a good understanding of all of the objects and advantages of my invention. The appended claims have been drawn with a view to covering all legitimate modifications and adaptations.

I claim:

1. In a strainer having a bowl, a bowl encircling frame formed to provide a pair of handle supports extending past one another at one side of the bowl and bent outwardly away from the bowl and having the extremities thereof bent toward each other, and a handle having said extremities received in opposite ends thereof, said handle supports being movable relative to one another for the engagement or disengagement of the extremities in the opposite ends of the handle but detachably engaging the bowl so that the extremities are held against disengagement from the ends of the handle.

2. In a strainer having a bowl and a circular supporting rim, a supporting frame therefor, said frame being made of two substantially bail-shaped pieces of wire each bent to substantially semi-circular form whereby to define a circle with the two pieces disposed in opposed relation for reception of the circular supporting rim of the bowl, said pieces being disposed so that the end of one extends past the end of the other at opposite sides of the bowl, said ends being bent outwardly with respect to the bowl and having the extremities thereof bent toward each other, and a pair of handles at opposite sides of the bowl each disposed with the extremities entered in the opposite ends thereof, the construction set forth being such that the entry of the circular supporting rim of the bowl in the frame keeps the extremities from disengagement from the ends of said handles.

3. A strainer as set forth in claim 2 wherein the circular portion of said frame is slightly undersize with reference to the circular supporting rim of the bowl so as to require spreading of said circular portion for entry of the rim therein, said frame being resilient between the circular portion and the extremities entered in the handles, whereby to permit spreading thereof for the purpose stated and whereby said frame resiliently grips the rim of the bowl when entered therein.

4. A strainer as set forth in claim 2 wherein the circular portion of said frame is slightly undersize with reference to the circular supporting rim of the bowl so as to require spreading of said circular portion for entry of the rim therein, said frame being resilient between the circular portion and the extremities entered in the handles, whereby to permit spreading thereof for the purpose stated and whereby said frame resiliently grips the rim of the bowl when entered therein, the handles being furthermore of such length whereby the same are resiliently gripped between the end portions of the wires by reason of spreading of the wires by entry of the circular supporting rim therebetween.

ARTHUR G. ANDREWS.